UNITED STATES PATENT OFFICE.

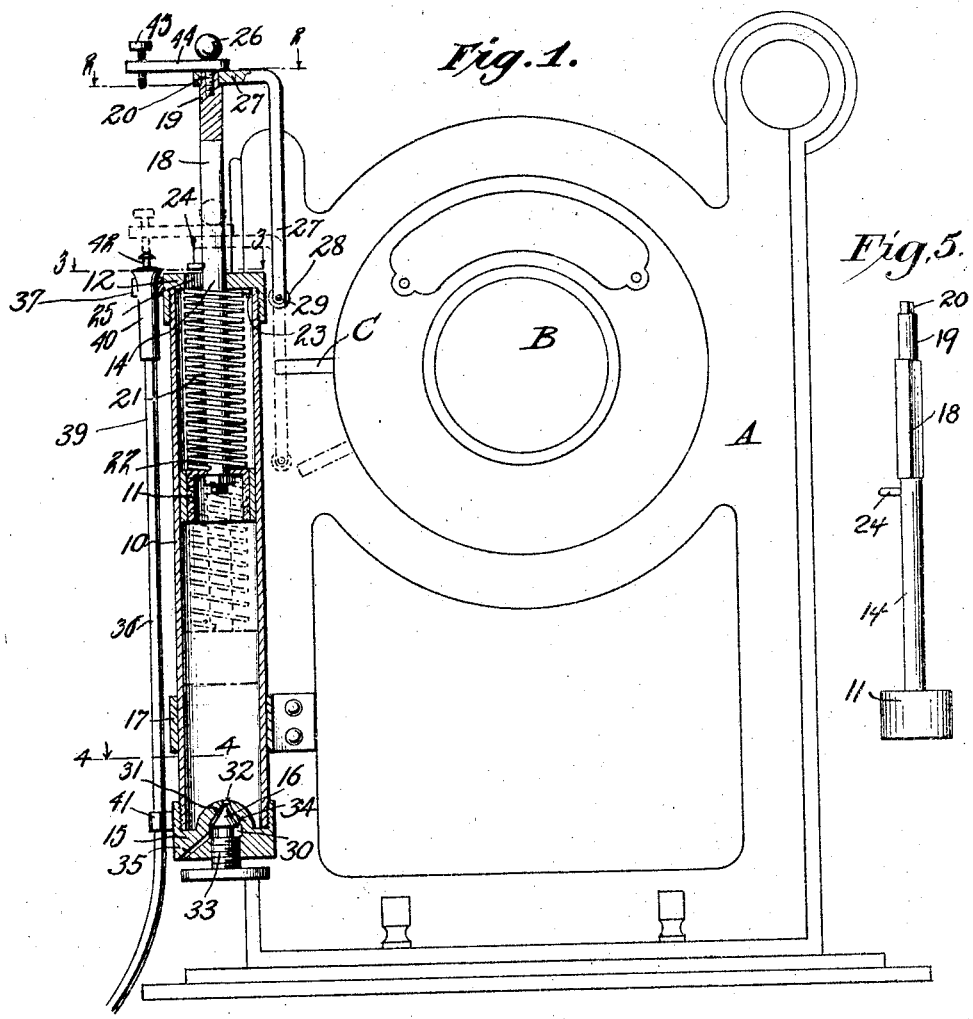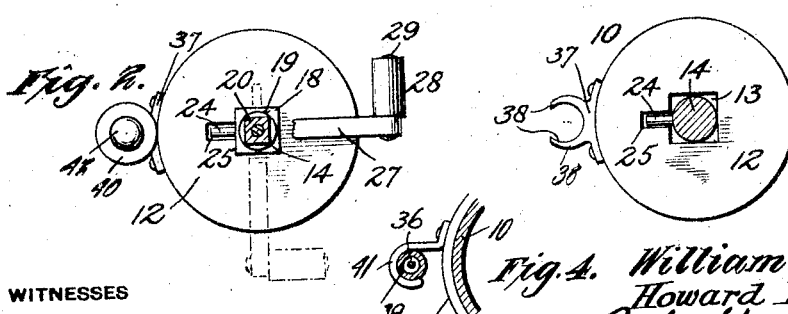

WILLIAM L. DAVIS AND HOWARD ENSMINGER, OF PORTLAND, OREGON.

CAMERA ATTACHMENT.

1,379,086.                 Specification of Letters Patent.      Patented May 24, 1921.

Application filed August 9, 1916, Serial No. 114,025. Renewed September 28, 1920. Serial No. 413,406.

*To all whom it may concern:*

Be it known that we, WILLIAM L. DAVIS and HOWARD ENSMINGER, citizens of the United States, residing at Portland, in the county of Multnomah and State of Oregon, have invented certain new and useful Improvements in Camera Attachments, of which the following is a specification.

This invention relates to an automatic shutter release mechanism for cameras, and has for its object to provide a device which, after being set and released, will move a certain distance with great rapidity at the beginning of its operative stroke and then complete its movement in much slower time, thus enabling a person after positioning and setting his camera and the release mechanism and subsequently tripping the release, but before the latter operates the shutter, to assume a position in front of the camera and have his own picture taken.

Another object of the invention is directed to means secured to the release mechanism for the attachment of a cable release whereby the release mechanism may, when desired, be operated by the cable release, the attaching means being of such nature that the cable release may remain in connection with the shutter release and be used optionally with the other form of release for tripping the shutter.

Still another object of the invention is to provide a camera shutter release mechanism in which the shutter is tripped by a spring operating on a plunger in a cylinder which acts to compress the air in said cylinder after a sudden quick movement for a certain distance, said compressed air being permitted to escape through a minute aperture, permitting the plunger and piston to complete their movement at a much slower rate.

A further object of the invention is to provide a release mechanism for the purpose described with means which after operating to trip or release a shutter will, after its movement has been completed, automatically shift its position away from the shutter operating lever and remain in this position until again set for operation.

With these as the principal objects in view and others to be set forth in detail in the following specification, the invention consists in the novel construction, and combination of parts herein described and illustrated in the accompanying drawing, in which—

Figure 1 is a vertical longitudinal sectional view of the release mechanism shown in position on the front of a camera, Fig. 2 is a horizontal sectional view on the line 2—2, Fig. 3 is a similar view on the line 3—3 of the same figure.

Fig. 4 is a sectional detail view on the line 4—4.

Fig. 5 is a detail perspective view of the piston rod and the piston mounted thereon.

Referring to the drawings by numerals, 10 indicates an upright tubular member or cylinder within which a piston 11 is adapted to reciprocate, said cylinder being closed at its upper end by a cap 12 having a square opening 13 therethrough for the passage of a piston rod 14, and a cap 15 on its lower end provided with a valve 16. The cylinder 10 is secured by a clamping band 17 on the front of a camera A at one side of lens B from which side the shutter operating lever C projects toward the cylinder 10.

The piston rod 14 is connected at its lower end to the piston 11 and for the lower half of its length is cylindrical in cross section as shown more particularly in Fig. 3. The upper portion 18 is square in cross section except near its upper end at which for a short distance there is formed a cylindrical portion 19 which terminates at its upper extremity with a smaller squared portion 20. Surrounding the piston rod 14 between the cap 12 and the piston 11 is a helical spring 21, one end of which is connected by a pin 22 to the piston 11 and the other end by a pin 23 to the cap 12. At about the dividing line between the lower cylindrical portion of the piston rod 14 and the upper square portion 18 thereof is a horizontal projecting pin 24 that is adapted to pass through a slot 25 in the cap 12 when the piston rod is raised to a suitable height and turned into a predetermined position, this movement of the piston rod being accomplished by grasping with the thumb and finger a finger piece 26 screwed into the top of the piston rod for lifting said piston rod.

On the upper square terminal 20 of the piston rod 18 is fitted an arm 27 that extends horizontally for a short distance and then turns downwardly, the lower end of said arm having a roller 28 projecting from one side thereof and turning on a pin 29 secured to said arm.

The cap 15 at the lower end of the cylinder 10 has a chamber 30 therein which is formed into a valve seat 31 at its upper end and communicates through a minute opening 32 with the interior of the cylinder 10. At its lower side the chamber opens outwardly through a threaded bore in which is screwed the threaded stem 33 of the valve 16, the upper end of said stem being coned as at 34 to engage the seat 31 and close external communication with the cylinder 10. A minute passageway 35 extends from the chamber 30 outwardly for the passageway of air to and from the cylinder when the valve 16 is opened.

When in released or inoperative position the piston will be near the lower end of the cylinder as in dotted lines in Fig. 1 and the arm 27 will extend in front of the cylinder 10 as in dotted lines, Fig. 2, being held in this position by the tension of spring 21. To set the release mechanism the operator grasps the finger piece 26 and rotates the piston rod 14 against the tension of the spring 21 until the trip arm 27 lies in the position shown in full lines in Fig. 2. The piston rod 14 is then lifted, the square portion 18 of said rod being in position to pass through the square opening in the cap 12. At the limit of the upward movement of the piston rod, the pin 24 will have passed through the slot 25 and then upon release of the finger piece the rotary operation of the spring will again turn the rod through a quarter revolution into its normal position and the rod will be maintained in this position through contact of the pin 24 on the cap 12. The piston rod may be readily turned when in elevated position because the cylindrical portion of said rod will at that time be in the square opening 13 of the cap 12. When it is desired to trip the camera shutter the operator turns the piston rod through a quarter revolution to bring the trip arm 27 above the shutter trigger C and the pin 24 in line with the slot 25, whereupon the spring 21 forces the piston downwardly through the cylinder 10 and causes the square portion of the piston rod to enter the square opening in the cap 12 and prevent said rod turning so as to bring the trip arm into contact with the shutter trigger and operate the shutter. The piston rod will thus be held in position to maintain engagement of the roller 28 with the shutter trigger C until the piston reaches its lowest limit at which time the cylindrical portion 19 of the piston rod will enter the square opening in the cap and under the action of spring 21 the parts will be returned to normal position.

The first movement of the piston and piston rod will be rapid, but later, owing to the compression of the air within the cylinder, this movement will be slowed down and can be regulated by screwing the valve 16 more or less closely to the seat to vary the quantity of air permitted to escape through the minute opening 35. It will thus be seen that by means of this device an operator can after focusing the camera on a party or any particular object or point, join said party or place himself at the point focused and have his photograph taken with the other person or objects, this being possible by regulating the outlet of air through the perforation 35.

For the purpose of securing a cable release 36 to the shutter release mechanism, there is provided a bracket 37 riveted to the cap 12 on one side, said bracket comprising two-horn-like projections 38 that curve toward each other but are separated sufficiently for the cable 39 of the cable release to be inserted, yet sufficiently close together to prevent the head 40 of the cable release from being withdrawn after the head has been seated between said horns. A hook 41 is attached to the lower cap 15 on one side to permit the insertion of the cable 39 and hold the same close against the cylinder 10. The head 40 of the cable release is enlarged at its upper end as shown to prevent it dropping or slipping through the opening in the bracket 37 and through this enlargement the upper headed end 42 of the cable projects and is adapted to bear upon the lower end of an adjustable thumb screw 43 threaded in a horizontal arm 44 that projects laterally from the upper end of the piston rod 14 and secured thereto above the arm 27 by the finger piece 26. By using a thumb screw 43 proper adjustment between the cable release and the shutter release may be obtained with great accuracy.

What is claimed is:

1. In a camera shutter operating mechanism, the combination of a cylinder, an air compressing piston in said cylinder, a piston rod having a cylindrical portion adjacent the piston, a square portion beyond and a cylindrical portion beyond the square portion, a square opening in the head of said cylinder to guide the piston rod and prevent rotation thereof, a spring for actuating said piston to compress air in the cylinder and to give partial rotation to the piston rod, a valve for permitting gradual escape of compressed air from the cylinder, a lateral projecting pin on the piston rod for maintaining the piston in a retracted position and adapted to pass through a slot in the piston head, and a trip arm connected to and movable with said piston rod to operate the shutter trigger.

2. In a camera shutter operating mechanism, the combination of a cylinder, a piston movable longitudinally within the cylinder, a closure for one end of the cylinder, a piston rod having a cylindrical portion at each end to permit rotation, and an intermediate square portion movable through and guided by said closure to prevent rotation between the extremes of movement, a spring within the cylinder surrounding said piston rod and connected at its ends respectively to the piston and to one end of the closure to force the piston toward the opposite end of the cylinder and rotate the same at the extreme limits of its movement, a shutter trip arm secured to said piston rod, and a valve closure for the opposite end of the cylinder to control the speed of movement of said piston by regulating the outflow of air therefrom.

In testimony whereof we affix our signatures in presence of two witnesses.

WILLIAM L. DAVIS.
HOWARD ENSMINGER.

Witnesses:
G. E. HAMAKER,
ALBERT STREIFF.